United States Patent [19]

DeMarthe et al.

[11] 4,288,304
[45] Sep. 8, 1981

[54] HYDROMETALLURGICAL PROCESS FOR TREATMENT OF SULPHUR ORES

[75] Inventors: Jean-Michel DeMarthe, Viroflay; Louis Gandon; André Georgeaux, both of Rambouillet, all of France

[73] Assignee: Societe Miniere et Metallurgique de Penarroya, Paris, France

[21] Appl. No.: 150,179

[22] Filed: May 15, 1980

Related U.S. Application Data

[63] Continuation of Ser. No. 677,515, Apr. 16, 1976, abandoned.

[30] Foreign Application Priority Data

Apr. 21, 1975 [FR] France .............................. 75 12373

[51] Int. Cl.³ .................... C22B 19/26; C22B 13/08; C22B 11/04
[52] U.S. Cl. .................................. 204/111; 204/118; 204/119; 75/101 BE; 75/109; 75/114; 75/117; 75/118 R; 75/120; 423/24; 423/98; 423/100; 423/38; 423/109
[58] Field of Search .............. 75/101 R, 101 BE, 109, 75/114, 117, 118 R, 120; 423/24, 38, 98, 100, 107, 109; 204/107, 111, 117, 118, 119

[56] References Cited

U.S. PATENT DOCUMENTS

| 507,130 | 10/1893 | Hoepfner | 204/107 |
|---|---|---|---|
| 704,639 | 7/1902 | Hoepfner | 204/107 |
| 735,098 | 8/1903 | Hoepfner | 75/114 |
| 752,320 | 2/1904 | De Alzugary | 75/114 |
| 1,185,902 | 6/1916 | Handy | 75/114 |
| 1,539,714 | 5/1925 | Christensen | 75/120 X |
| 1,736,659 | 11/1929 | Mitchell | 75/114 |
| 2,424,351 | 7/1947 | Christensen | 75/114 |
| 3,441,372 | 4/1969 | Pegler | 75/101 BE |
| 3,753,692 | 8/1973 | Bourchier | 75/120 |
| 3,764,490 | 10/1973 | Chambers | 75/114 |
| 3,776,826 | 12/1973 | Atadan | 204/107 |
| 3,785,944 | 1/1974 | Atwood | 75/104 |
| 3,849,121 | 11/1974 | Burrows | 423/109 |
| 3,923,616 | 12/1975 | Atadan | 204/107 |
| 3,929,598 | 12/1975 | Stern | 204/108 |
| 3,958,986 | 5/1976 | Thorsen | 75/101 BE |
| 3,988,224 | 10/1976 | Barriere | 423/100 |
| 3,998,628 | 12/1976 | Gandon | 75/104 |

FOREIGN PATENT DOCUMENTS

| 601713 | 2/1935 | Fed. Rep. of Germany | 75/120 |
|---|---|---|---|
| 2193092 | 2/1974 | France | 75/117 |

*Primary Examiner*—Brian E. Hearn
*Attorney, Agent, or Firm*—Fleit & Jacobson

[57] ABSTRACT

The invention provides a process for extracting zinc from a sulphur- and zinc-containing ore which involves (a) leaching the sulphur ore or concentrate with an aqueous solution of cupric chloride, which can be regenerated by means of a regenerating agent and air; (b) subjecting the solution thus obtained to liquid-liquid extraction by means of an organic phase, preferably containing a solvent, comprising an acid organophosphorus compound; and (c) recovering the zinc contained in the said organic phase after the said extraction, preferably by elution. If justified by the composition of the ore, the following optional recovery steps may then be performed:

(1) if lead is present, recovery of lead by cementation (i.e., precipitation) or by crystallization of lead dichloride followed by cementation of the crystallizate;
(2) if copper is present, recovery of copper by cementation or by liquid-liquid extraction; and
(3) if precious metals, e.g., silver, are present, recovery of the precious metals by cementation or by selective electrolysis.

69 Claims, 4 Drawing Figures

What is claimed is:

1. In a method for electrochemically treating a first solution containing a selected material so as to effect a desired change in said first solution, said method comprising the steps of:
    passing said first solution in contact with one side of a porous membrane under electrochemical conditions such that said selected material reacts to produce a first product;
    passing said deposited first product through said porous membrane to the other side thereof; and
    reacting said first product in a second solution in contact with said other side to produce a second product;
    the improvement which comprises providing as said porous membrane a porous bi-polar electrode, maintaining one side of said porous bi-polar electrode at a first predetermined electrical potential versus a reference electrode in said first solution and electrochemically depositing said first product onto said one side, maintaining the other side of said porous bi-polar electrode at a second predetermined electrical potential verses a reference electrode in said second solution, while fixing said porous bi-polar electrode at ground.

2. In a method according to claim 1, the improvement wherein said first potential comprises a negative potential and said second potential comprises a potential more positive than said first potential.

3. In a method according to claim 1, the improvement wherein said second potential comprises a positive potential.

4. In a method according to claim 1, the improvement wherein said second potential is zero.

5. In a method according to claim 1, including the step of passing a stream of said first solution in contact with said one side.

6. In a method according to claim 1, including the step of electrochemically removing said second product from said second solution.

7. In a method according to claim 6, the improvement wherein said first and second solutions comprise aqueous solutions, and a non-aqueous, water immiscible liquid is loaded within said porous, bi-polar electrode, and including the steps of (a) producing a water immiscible product on said one side of said porous, bi-polar electrode, (b) dissolving said water immiscible product in said non-aqueous, water immiscible liquid and passing said dissolved product through said porous, bi-polar electrode to the other side thereof, and (c) reacting said product on said other side.

8. A method for removing selected material from a first solution containing the same comprising:
    passing said first solution through an electrochemical cell in contact with one side of a porous membrane under conditions such that at least a portion of said selected material reacts to form a first product which is deposited onto said one side;
    passing said first product through said membrane to the other side thereof;
    contacting said first product with a second solution in contact with said other side under conditions such that said first product reacts to form a second product; and,
    stripping said second product from said other side;
    wherein said porous membrane comprises a porous bi-polar electrode, maintaining one side of said porous bi-polar electrode at a first predetermined electrical potential versus a reference electrode in said first solution, maintaining the other side of said porous bi-polar electrode at a second predetermined electrical potential versus a reference electrode in said second solution, while fixing said porous bi-polar electrode at ground.

9. A method according to claim 8, wherein said selected material comprises a metal, said first predetermined potential comprises a negative potential, and said second predetermined electrical potential comprises a potential more positive than said first potential.

10. A method according to claim 9, wherein said second potential comprises a positive potential.

11. A method according to claim 9, wherein said second potential is zero.

12. A method according to claim 11, the improvement wherein said more positive electrochemical potential is zero.

13. A method according to claim 8, including the step of passing a moving stream of said first solution in contact with said one side.

14. A method according to claim 13, including the step of passing said moving stream in succession through a plurality of said cells.

15. A method according to claim 14, including the step of maintaining the potential in at least one of said plurality at a value which is different than the potential maintained in others of said plurality.

16. A method for electrochemically removing metal ions from an aqueous solution containing same, said method comprising the steps of:
    passing said aqueous solution through an electrochemical cell in contact with one side of a porous membrane under conditions such that at least a portion of said metal ions are stripped out of said solution and are deposited as metal on said one side;
    diffusing said deposited metal through said porous membrane into the other side thereof; and,
    stripping said diffused metal from said other side as ions into a second solution in contact with said other side;
    wherein said porous membrane comprises a porous bi-polar electrode, maintaining one side of said porous bi-polar electrode at a first predetermined electrical potential versus a reference electrode in said first solution, maintaining the other side of said porous bi-polar electrode at a second predetermined electrical potential versus a reference electrode in said second solution, while fixing said porous bi-polar electrode at ground.

17. A method according to claim 16, including the steps of providing a counter electrode in contact with said second solution, and redepositing said stripped ions from said second solution onto said counter electrode.

18. A method according to claim 17, the improvement wherein said aqueous solution comprises a plurality of metal ions, and including the step of passing said aqueous solution in succession through a plurality of said electrochemical cells, and removing selected metal ions in different cells.

19. A method according to claim 18, the improvement wherein a negative electrochemical potential is established in the solution on said first side and an elec-

HYDROMETALLURGICAL PROCESS FOR TREATMENT OF SULPHUR ORES

This is a continuation of application Ser. No. 677,515 filed Apr. 16, 1976 abandoned.

This invention relates to a hydrometallurgical process for treatment of sulphur- and zinc-containing ores or concentrates, and particularly of ores or concentrates also containing other non-ferrous metals such as lead, copper and precious metals to recover zinc and optionally other non-ferrous metals therefrom.

A large category of highly pyritic lead-zinc-copper ores, found chiefly in Europe, for example in the Iberian Peninsula, in Australia and in Canada are little, if at all, exploited as a source of non-ferrous metals. At present such ores are utilised primarily as sulphur ores, and thus employed for the production of sulphuric acid; and in fact they are not readily susceptible to flotation techniques for the production of marketable differential concentrates of copper, lead and zinc.

It will be readily appreciated that, since these ores contain only a few percent of non-ferrous metals and about 50% of sulphur, the establishment of a metallurgical extraction technique of a suitable capacity (e.g., able to deal with 50,000 tons of non-ferrous metals per annum) would, if linked to the production of sulphuric acid, involve the production of 2 to 3 million tons of sulphuric acid. For this reason a metallurgical extraction technique applied to the ash of such pyrites will only very rarely be operable on an acceptable scale.

On the other hand, some ores of the category mentioned above are suitable for treatment by bulk flotation, which permits concentration of the non-ferrous metals with a good recovery yield; however, because of the lack of a treatment process suitable for such concentrates these flotation processes are not employed industrially.

In certain limited cases it is also possible, starting from pyrites, to produce zinc, lead and copper concentrates by differential flotation. Unfortunately the commercial concentrates produced represent only a small proportion of the non-ferrous metals initially present, it being difficult to achieve a recovery yield even of 50%. The differential flotation rejects can be concentrated as Pb-Zn-Cu middlings, in which the sum of lead, zinc and copper is about 15%, a product which is unacceptable for treatment by classical metallurgical techniques. As differential flotation permits utilization only of less than half of the non-ferrous metals present and for this reason is not industrially profitable, it, too, is not at present employed industrially.

It is also known that zinc concentrates often contain precious metals, recovery of which is seldom profitable by the methods of classical metallurgy.

Finally, it is well known that the relative contents of the various constituents of ores vary widely from one point to another in the same deposit and that, in these conditions, it is desirable that the ore treatment process should be sufficiently flexible to adapt to the different contents.

Thus, one object of the present invention is to provide a process for treatment of the non-ferrous metals contained in pyrites deposits without attacking the pyrites content and without modifying the pyrites structure, so that in this way it will be possible to treat several million tons of pyrites annually and operate a metallurgical technique of suitable proportions, without the necessity to roast the leaching tailings, i.e. the residual purified pyrites, except in accordance with the demand for sulphuric acid.

Another object is to permit treatment of the bulk or concentrates discussed above and to permit treatment of differential flotation rejects so as to make differential flotation profitable.

In accordance with the present invention, a process for extracting zinc from a sulphur- and zinc-containing ore comprises:

(a) leaching the sulphur ores or concentrates with an aqueous solution of cupric chloride, which can be regenerated by means of a regenerating agent and air;

(b) subjecting the solution thus obtained to liquid-liquid extraction by means of an organic phase preferably containing a solvent chosen from acid organophosphorus compounds;

(c) recovering, preferably by elution, the zinc contained in the said organic phase after the said extraction;

If justified by the composition of the ore, the following optional recovery steps may then be performed:

(i) recovery of lead by cementation (i.e. precipitation) or by crystallization of lead dichloride followed by cementation of the crystallizate;

(ii) recovery of copper by cementation or by liquid-liquid extraction;

(iii) recovery of precious metals by cementation or by selective electrolysis;

The elimination of iron in the form of goethite takes place during the leaching step (a) above, as will be described in more detail later.

The first step (a) of the process according to the present invention, namely leaching in a cuprous/cupric medium, is described in the case of complex ores containing lead, zinc and copper in our British Patent Application No. 20571/75 and consists essentially of subjecting the starting product to leaching with an aqueous solution of cupric chloride, while controlling the redox potential to about from 400 to 800 millivolts relative to the potential of a hydrogen electrode, and at a temperature of not less than 50° C. and regenerating the said aqueous solution by means of a regenerating agent and air at atmospheric pressure. Preferably the aqueous solution of cupric chloride should also contain an agent for the solubilization of cuprous chloride chosen from alkali metal chlorides, alkaline-earth metal chlorides, ammonium chloride and ferrous chloride. The regenerating agent which is always employed in conjunction with air at atmospheric pressure may be either hydrochloric acid or ferrous chloride, and one of two methods of regeneration of cupric chloride may be used or both methods may be used together depending on the ores to be treated and the aims to be achieved. When ferrous chloride is used as the regenerating agent, the pH of the aqueous solution of cupric chloride is from 1 to 3 and the concentration of cuprous ions in said aqueous solution of cupric chloride is greater than 1 gram per liter.

It must be noted in this connection that it is very surprising, even to experts in the subject, to find that if cuprous chloride is regenerated by a mixture of ferrous chloride and air, the process according to the invention permits elimination, at this stage, of the iron contained in the solution in the form of an easily filtered hydroxide, generally known by the name of goethite.

This elimination step is preferably performed at a temperature above ambient temperature, and while monitoring the redox potential of the leaching solution.

The value to adopt for each of the various operational parameters largely depends on the starting product to be treated and the precise aims set for the operation. Accordingly one may wish to dissolve the maximum quantity of non-ferrous metals and accept that a proportion of the sulphur and of the pyrites will also go into solution. Conversely, a smaller proportion of dissolution of the non-ferrous metals may be acceptable, in order to restrict the proportions of sulphur and pyrites dissolved. It is quite evident that these two initial choices correspond to different operational parameters, but experts in the subject will easily be able to determine which choice to adopt, on the basis of the detailed explanation given in British Patent Application No. 20571/75.

Furthermore, the ratio between cupric copper and cuprous copper can easily be adjusted; if a solution containing only cupric chloride is desired, all that is required is to add to the leaching solution a stoichiometric quantity of hydrochloric acid in the presence of air. If it is desired to obtain an entirely cuprous solution, leaching is effected using the recycled cupric chloride, which is reduced to the cuprous state, and with an addition of hydrochloric acid, the quantity added being less than stoichiometric.

The selective solution stages as described in British Patent Application No. 20571/75 makes it possible to dissolve all the non-ferrous metals contained in the ore or in the concentrate. However, we have found that it is possible to leach the lead preferentially by subjecting the ore or concentrate to leaching by a solution containing a quantity of cupric chloride roughly equal to that which is stoichiometrically necessary to dissolve the lead, and only the lead.

Accordingly, according to one variant of the process of the present invention which is particularly suitable for lead-rich ore, leaching is conducted in two stages: in the first stage the lead is dissolved selectively and in the second stage the copper, the zinc and other non-ferrous metals are then dissolved; it should be noted that the cupric copper can be advantageously regenerated in situ only in this second stage.

The solution obtained from the first stage of leaching is then treated, according to techniques described later, for recovery of the lead that it contains, then it is returned to the treatment circuit for the solution from the second stage, it being possible to regard this circuit as the principal circuit.

Liquid-liquid extraction of zinc is accomplished by combining the solution obtained by leaching with an organic phase containing, preferably, an acid organophosphate compound of the type exemplified by di-2-ethyl-hexylphosphoric acid (or D2EHPA), although other compounds can perform the same role.

Although the use of acidic organophosphorus compounds such as D2EHPA offers considerable advantages which will be described later, other compounds may be suitable. Of these, mention may be made of neutral organophosphorus compounds such as tributyl phosphate which permits selective extraction of zinc relative to copper. This technique, however, has the drawback that the chloride ions are extracted at the same time as the zinc. Nevertheless, this drawback can easily be circumvented or reduced; as, on the one hand the zinc chloride is marketable as such, and on the other hand it is possible to electrolyze zinc chloride to obtain metallic zinc and chlorine. The latter can then be employed for regenerating the cupric chloride. Finally, the zinc chloride can be pyrohydrolyzed to give hydrochloric acid and zinc oxide, the latter being saleable as such or dissolved in sulphuric acid to give a solution of zinc sulphate which can be electrolyzed, this operation producing metallic zinc and regenerating the sulphuric acid. The hydrochloric acid can of course be recycled for use as the regenerating agent in the solution stage.

These organophosphorus compounds, which are hereinafter called solvents, may be diluted with diluents, examples of such diluents being kerosene and the products sold under the trade names of "Solvesso 150" and "Escaid 100". "Solvesso 150" is an oil distillation fraction the ebullition point of which is about 150° C. and the content of which exceeds 99% in aromatic hydrocarbons. "Escaid 100" is also an oil distillation fraction which is a mixture of about 20% of aromatic hydrocarbons and about 80% of aliphatic hydrocarbons.

If an organophosphorus acid is chosen as solvent, it is possible to extract the zinc in small quantities according to a conventional method but it is particularly advantageous to control the leaching conditions in such a way that the copper contained in the solution to be extracted is totally or partly in the cuprous form. This makes it possible to oxidize the cuprous copper during the zinc-extraction step. The novelty of the method lies principally in the combination of oxidation of the cuprous chloride and selective extraction of the zinc in the same operation.

Alkyl phosphoric acids are known as extraction agents for metals present in solution, and notably as extraction agents for copper and zinc. However, the capacity and selectivity of the extraction of the metals is markedly dependent on the conditions obtaining in the solution; thus, zinc is extracted to a notable extent when the pH of the solution is above 0.3, and copper is extracted at a pH of 1.5 or above. It will be readily appreciated that if the pH has a value greater than 1.5 there will be co-extraction of copper and zinc, but if the pH is below 0.3 neither zinc nor copper will be extracted. Now if the solution is brought into contact with an organic solvent, an exchange equilibrium between the zinc or copper ions and the hydrogen ions initially present in the organic solvent, occurs in accordance with the equilibrium:

$$Zn^{++} + 2HR \rightleftharpoons ZnR_2 + 2H^+$$

where $Zn^{++}$ represents the cations contained in the aqueous phase, HR represents cation-exchanger organic reagent, $ZnR_2$ represents the organic zinc complex in the organic phase, and $H^+$ represents the acidity liberated in the aqueous phase.

According to this reaction the normality of the aqueous phase is doubled for each mole of zinc extracted. Only very limited extraction of the zinc is therefore obtained, as the aqueous phase is acidified in proportion.

In accordance with the method according to the present invention, the excess hydrogen ions are utilised in the aerial oxidation of the cuprous ions in accordance with the reaction:

$$Cu^+ + H^+ + \tfrac{1}{4}O_2 \rightarrow Cu^{++} + \tfrac{1}{2}H_2O$$

in such a way that it is possible to control, by injection of air, the pH during extraction of the zinc, so as to maintain the pH in the optimum range of 0.3 to 1.5. Overall this leads to the following reaction:

Ti $Zn^{++} + 2HR + 2Cu^+ + \frac{1}{2}O_2 \rightarrow ZnR_2 + 2Cu^{++} + H_2O$

This selective extraction of zinc, when combined with oxidation, thus permits regeneration of the cupric chloride, which is necessary for step (a).

One or two mixer-decanters are sufficient to accomplish solvent extraction of zinc according to the process of the invention. It should also be pointed out that, according to the overall reaction that has just been described, it is only possible to extract one mole of zinc for every two moles of copper oxidized, which in theory limits the application of the method. However, if it is desired to extract more than one mole of zinc for every two moles of copper oxidized, it is sufficient to revert to a more traditional extraction technique, in which all the acid liberated is not consumed by oxidation.

Although the temperature of extraction may be ambient temperature, it is preferably between 20° and 60° C. The pH of the solution is maintained at a value close to 1, although it is possible to use more acidic solutions.

The ratio between the volume of the organic phase and the volume of the aqueous phase is set in relation to the other operating conditions, and in particular as a function of the quantity of zinc to be extracted. As a guide, it will be found that a ratio of from 0.5 and 5 is suitable, and the organic solvent contains from 2 to 25 g/l zinc.

At this stage of the description it should be pointed out that the ferric iron interferes with extraction considerably and it is advisable to remove any iron from the solution by precipitating, in the presence of cupric copper, the ferrous iron in the form of goethite. Moreover when iron is used as the cementation agent, the solutions resulting from this cementation and containing ferrous iron will have to be recycled upstream from this stage for precipitation of iron as goethite. This stage can, however, take the place of the precipitation of the iron as goethite during regeneration of the cupric copper in situ in step (a).

By this extraction step there is obtained a zinc-laden organic phase which can easily be regenerated by contact with a sulphuric acid solution with a concentration of from 100 and 200 g/l, in accordance with the reaction:

$ZnR_2 + H_2SO_4 \rightarrow 2HR + ZnSO_4$ where $ZnR_2$ is the organic compound resulting from the extraction step and HR is the regenerated organic solvent, it being possible to employ the latter for a fresh extraction of zinc.

This re-extraction is effected in counterflow in the mixer-decanters, the number of which depends on the desired final zinc sulphate concentration, as well as the residual zinc content permitted in the solvent after regeneration. There is thus finally obtained an aqueous solution of zinc sulphate containing, usually, from 50 to 200 g/l of zinc.

In a variant of the above-described zinc recovery step, extraction may be combined with electrolysis, the exchange of chloride/sulphate anions being accompanied by transfer of protons from the electrolysis circuit to the leaching circuit. To avoid consumption of acid due to this transfer, one may electrolyse the zinc in a sulphate medium, which has the result of depositing metal at the cathode and forming acid at the anode in accordance with the reactions:

$Zn^{++} + 2e^- \rightarrow Zn$ (at the cathode)

$H_2O \rightarrow 2H^+ + \frac{1}{2}O_2 + 2e^-$ (at the anode)

The zinc deposited in this way is of quite remarkable purity, above 99.9%, especially when the solution of zinc sulphate resulting from re-extraction is placed in contact with metallic zinc prior to electrolysis.

It must also be pointed out that, according to the invention, it is possible to obtain extremely pure zinc solutions, whatever solvent is employed for extraction, whether a cationic solvent extracting the zinc as cations or a neutral solvent extracting all the zinc as neutral chloride, by subjecting the organic phase to washing by means of a pure and relatively concentrated solution of zinc chloride. "Relatively concentrated" should be taken to mean a zinc concentration greater than that of the solution coming from the last stage of re-extraction. The zinc chloride solution thus contaminated can easily be regenerated by bringing it into contact with metallic zinc, which has the effect of precipitating the vast majority of impurities and especially the copper.

When the ore contains a significant quantity of non-ferrous metals other than zinc, and in particular lead and copper, they may be recovered according to preferred aspects of the invention.

One of the characteristics of the process is that all the metals dissolved in the leaching stage are present in the form of chloride, which is fairly unusual, and the problems encountered are different from those in classical non-ferrous metallurgy. Thus, the solubilization in a chloride medium makes it possible to solubilize the lead, which is not possible when working in a sulphate medium. The solubility of lead chloride depends on the one hand on the chloride concentration of the medium, and on the other hand on the temperature. By regulating the leaching conditions and taking into account the lead content of the ore, one can easily achieve total solubilization of the lead which then accompanies the zinc during extraction.

Depending on the lead content of the ore, one of the following two methods of recovery will be chosen:

(1) If the lead content is low in comparison with the copper content, cementation of the copper and lead in solution will be carried out directly on a portion of the leaching solution. To obtain a precipitate which is rich in lead it is necessary to effect cementation of the copper first, either by zinc or by lead, and then effect cementation of the lead by zinc.

(2) If the ore has a high Pb/Cu ratio it would, in order to recover the lead, be necessary to subject all the leaching liquor to cementation and consequently to effect cementation of all the cupric chloride used for the leaching step, which would impose a considerable load on the process. It should be noted, however, that this difficulty does not arise when leaching is accomplished in two stages and the lead dissolved in the first stage can easily be recovered in this way. In other cases it is preferred to take advantage of the poor solubility of lead in the cold.

Accordingly, it becomes necessary to cool the leaching solution. This restriction is, however, only apparent, as it is in any case necessary to cool the leaching solution for solvent extraction of the zinc. Pure crystalline lead chloride is obtained which is then subjected to cementation. This can be effected with the use of zinc after re-dissolution in sodium chloride, or in another alkali or alkaline earth metal chloride, such as calcium chloride, or simply by pulping in water.

The cementation operation is in fact identical in principle for the two variants that have just been described. The advantage of this method is that zinc may be employed in the form of plate, for example, the cathodes produced by electrolysis, which obviates manufacture of powder. The reaction temperature is from ambient temperature to 80° C.

Cementation may also be effected with the use of iron. It has in fact been shown that, surprisingly, lead chloride pulped in water can easily be precipitated in the metallic state by iron; this is not possible when the lead is dissolved.

After the precipitation operation proper, the lead is separated from the solution, which then contains zinc chloride, or iron chloride. The lead metal is marketable either in this state, or melted in order to separate the residual zinc by liquation and obtain lead ingots: in the case of zinc chloride, the resulting aqueous solution is recycled to the leaching stage.

When the ore contains copper, it is necessary to recover the copper, in particular to prevent too much accumulation of copper in the leaching solution.

The method to be adopted for the recovery of the copper depends, as for the lead, on the initial copper content of the ore.

If the copper is not abundant, it is sufficient to precipitate it prior to cementation of the lead. This precipitate can easily be treated by one of the methods commonly employed for the recovery of copper in such circumstances.

If fuller recovery is necessary, in view of a higher copper content, it is possible to adopt a selective solvent extraction method in the presence of air, which permits on the one hand regeneration of half of the cupric chloride necessary for leaching, and, on the other hand, extraction of the other half in an organic solvent, e.g., a "Lix" reagent exemplified by "Lix 65 N" having the formula:

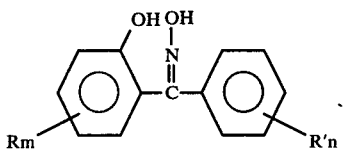

and a "Kelex" reagent exemplified by "Kelex 100" having the formuala:

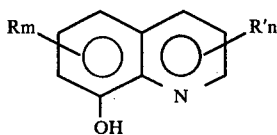

where Rm and R'n are substituents as known in the art.

The organic solvent is regenerated by contact with sulphuric acid, which permits electrolysis in a sulphate medium, this technique being the same as that described in British patent application No. 20573/75 and No. 20760/75.

The leaching solution is constantly recycled and the principal non-ferrous metal constituents of the ore are extracted selectively from the leaching solution; in these conditions the other metals accumulate in the system. It has in fact been established that precious metals, notably silver, for the most part pass into the solution because of the choice of an oxidative method of leaching. This accumulation is an advantage of the process according to the invention, as it then permits recovery of the precious metals from only a portion of the total flow. Recovery of precious metals is effected by cementation by copper powder or by electrolysis, which are perfectly selective because of the respective electrochemical reduction potentials of the precious metals. As well as lead and zinc, a precipitate or a cathode containing silver and copper is therefore recovered.

Some embodiments of the invention will now be described, by way of example, with reference to the accompanying drawings, in which:

FIG. 1 is a diagram showing a system applicable in the case where there is required only selective extraction of zinc contained in the solution to be treated, after having if necessary precipitated precious metals, copper and lead from a portion of the leaching solution;

Figure 2:
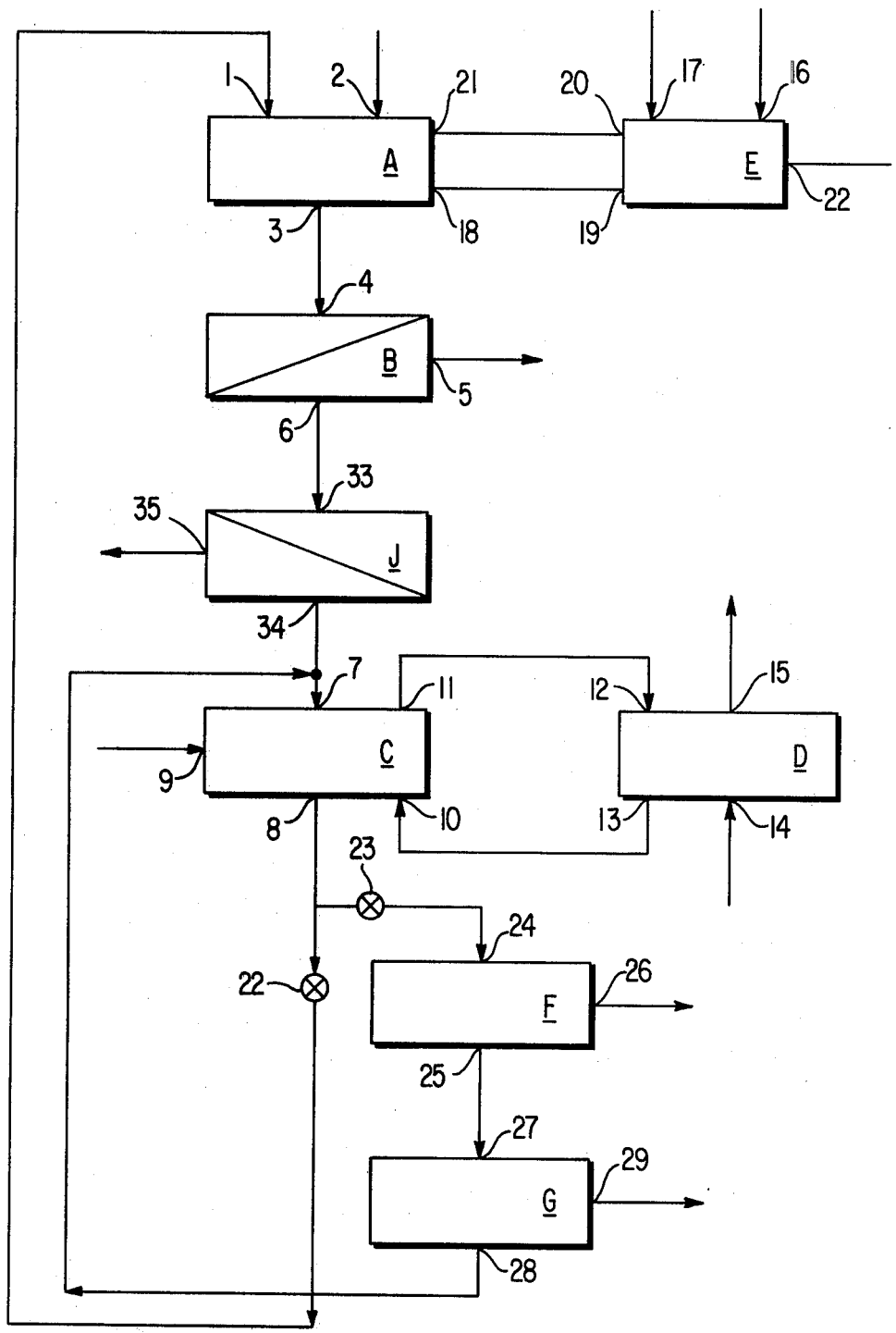
FIG. 2 shows a variant of the system of FIG. 1 in which partial cementation of the precious metals and copper follows extraction of zinc, whereas lead is eliminated by precipitation of the chloride.

Referring to FIG. 1, a solution of cupric chloride is introduced at 1 into reactor A, into a compartment of which the starting product (sulphur ore or concentrate) is fed at 2.

The leaching solution which leaves A at 3 is fed at 4 into a phase-separation apparatus B, in which the leaching residues are removed, for example sulphur in the elementary state or pyrites, and leaves the apparatus B at 6. The leaching residues are eliminated at 5.

The residue-free leaching solution then passes at 7 into a liquid-liquid extraction plant C where it comes into contact with the solvent, diluted for example with "Solvesso 150" or "Escaid 100". This organic phase is fed at 10 into plant C which preferably operates in counterflow and which is of conventional design using, for example, packed columns, rotary disc columns, pulse columns, multi-stage centrifugal extractors, compartmented apparatus of the mixer-decanter type or multiple hydrocyclones.

At this stage the zinc contained in the leaching solution passes into the organic phase. A solution of metal chlorides partially freed of zinc leaves apparatus C at 8, and may be subjected to further treatment or be recycled at 1. The zinc-laden organic phase leaving C at 11 enters at 12 contact apparatus D, which may be of one of the types specified in connection with the extraction plant C, and there undergoes scrubbing, preferably in counterflow, by means of an aqueous phase which is fed into apparatus D at 14 and leaves it at 15 in the form of an aqueous solution containing the zinc which was contained in the organic phase. The latter, thus washed, may be recycled and sent to inlet 10 of the liquid-liquid extraction plant C via 13.

An air inlet 9 is provided into extraction plant C to enable oxidation of the cuprous chloride to cupric chloride during or immediately after extraction.

To the system described above it is possible to add an apparatus E which may be a compartment of A and in which the cupric chloride solution is regenerated; the latter leaves, at 18, the compartment A where leaching takes place and is fed at 19 into E, where it comes into contact with air which is introduced at 16 and with a regenerating agent which is fed into E at 17. This regenerating agent comprises dilute hydrochloric acid or, in other cases, the ferrous chloride contained in the solution. The regenerated solution leaves E at 20 and is fed at 21 into the compartment of A where leaching occurs.

The iron in the leaching solution is precipitated in the form of goethite in apparatus E and is then discharged at 22.

When justified by the composition of the ore, a further series of apparatus is added to this system.

A portion of the leaching solution leaving B at 6 is sent, by means of a system of valves 22 and 23, into apparatus F at 24, and there it comes into contact with copper, which causes the cementation by copper of the precious metals contained in the leaching solution, this cementation preferably being electrochemical. The cementation products are discharged at 26, whereas the leaching solution free of precious metals leaves F at 25 and is fed at 27 into apparatus G where the copper is precipitated by cementation in contact with metallic lead and zinc and leaves G at 28, while the precipitate so formed is recovered at 29. In the case of cementation of copper by zinc, the completion of cementation of the copper is easily determined by measuring the potential of the solution.

The solution leaving G at 28 is fed at 30 into apparatus H, in which it makes contact with metallic zinc and leaves H at 31 free of lead; the precipitates containing lead is recovered at 32. The solution leaving H at 31 is then mixed with the solution leaving at 6 and passing through valve 22. Measurement of the potential of the solution permits effective determination of the completion of precipitation of lead.

FIG. 2, in which the parts identical to those in FIG. 1 have been given the same reference numbers and will not be described again, shows a variant of FIG. 1 which is specially adapted for lead-rich ores or concentrates. This variant differs from the preceding one in that a stage for crystallization of lead dichloride has been introduced, cementation of lead has been omitted and that the circuit controlled by valves 22 and 23 has been moved from upstream to downstream of apparatus C. Thus the leaching solution leaving B at 6 is fed at 33 into a phase separator J where it is cooled so as to cause the lead dichloride to crystallize and this is recovered at 35 while the solution leaving at 34 enters plant C at 7.

The solution leaving C at 8 is fed into the circuit 1 controlled by valves 22 and 23, then after leaving this circuit it is recycled at 1.

The lead chloride leaving J at 35 is either:

(1) redissolved, then precipitated by zinc, mother liquors containing zinc chloride being then recycled at 1; or (2) pulped and precipitated by metallic iron or zinc, it then being possible to recycle the rich mother liquors to apparatus E at 17, if ferrous chloride is involved, or to the principle circuit, for example at 7, if zinc chloride is involved.

Figure 3:
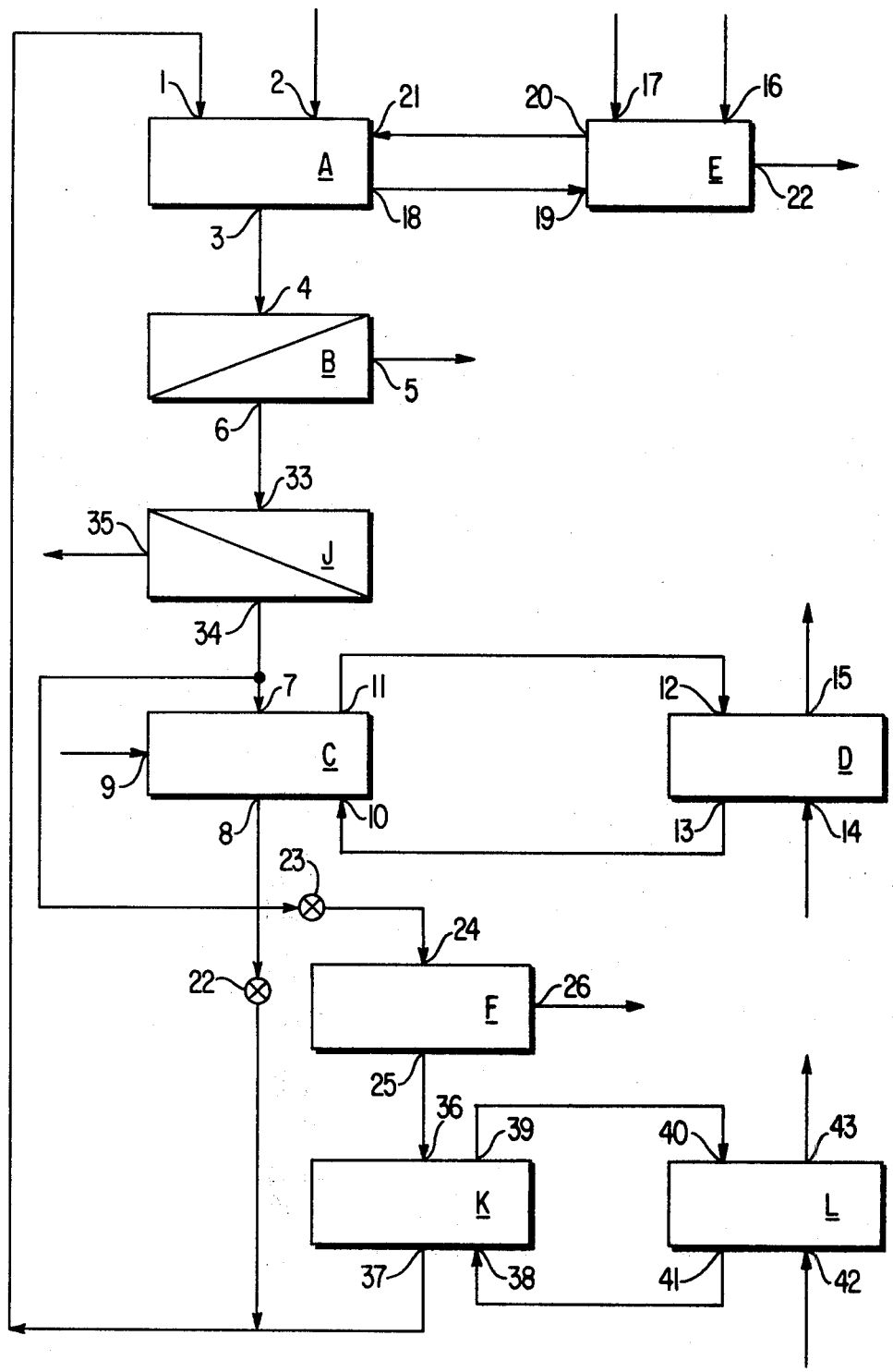
FIG. 3 shows a system similar to that of FIG. 2, but shows the case where the ore contains copper in sufficient quantity to justify liquid-liquid extraction.

FIG. 3, in which the parts identical to those in FIG. 2 have again been given the same reference numbers and will not be described again, shows a system particularly intended for treatment of copper-rich and lead-rich ores or concentrates; this system differs from the others in that apparatus G is replaced by a liquid-liquid extraction plant K.

Referring to FIG. 3, the solution of metal chlorides leaving F at 25 is fed at 36 into a liquid-liquid extraction plant where it is brought in contact with a dilute cation-exchanger solvent, for example, by "Escaid 100". This organic phase is fed at 38 into plant K which operates preferably in counterflow and which is of conventional design using, for example, packed columns, rotary disc columns, pulse columns, multi-stage centrifugal extractors, compartmented apparatus of the mixer-decanter type or multiple hydrocyclones.

At this stage the cuprous copper contained in the solution coming from F is oxidized to cupric copper, some of which passes into the organic phase. A solution of cupric chloride leaves apparatus K at 37 and is mixed with the solution coming from valve 22 then recycled at 1. The copper-laden organic phase leaving K at 39 is fed at 40 into a contacting apparatus, which can be of one of the types specified in connection with the extraction plant K and there it undergoes washing, preferably in counterflow, by means of a sulphuric acid solution which is fed into apparatus L at 42, and which leaves it at 43 in the form of aqueous solution containing the copper which was contained in the organic phase; thus washed, the organic phase leaves at 41 and may be recycled to the inlet 38 of the liquid-liquid extraction plant.

Figure 4:
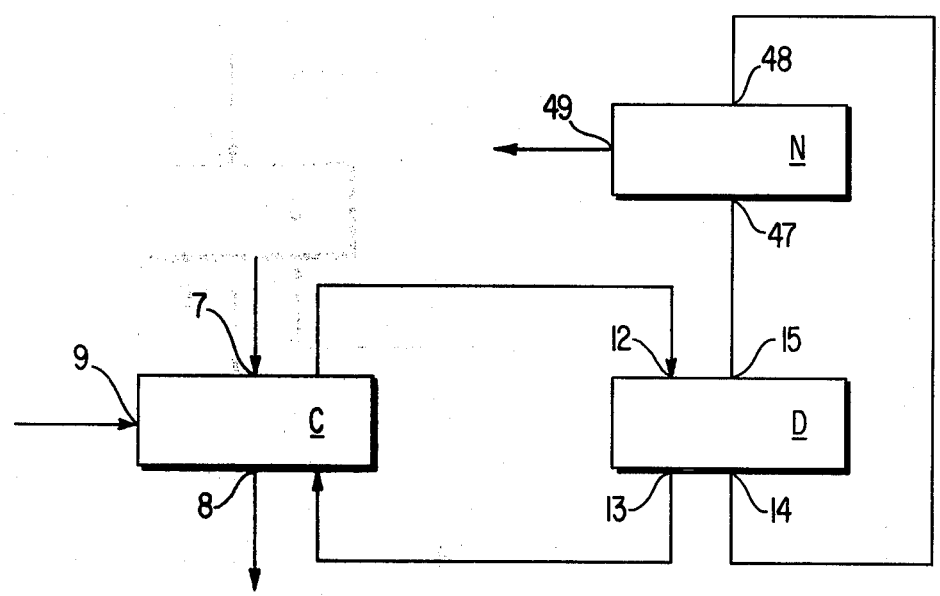
FIG. 4 illustrates a variant of treatment of the aqueous phase which has been used for elution of the zinc-laden organic phase.

FIG. 4, in which the parts identical to those in FIG. 1 have been given the same reference numbers and will not be described again, shows a modification of the previous systems intended for treatment of the zinc sulphate solution which leaves D at 15 with extraction being effected by means of an acidic organophosphorus solvent.

This solution is fed at 47 into an electrolysis tank N in which the zinc is brought to the metallic state and recovered at 49. A proportion of this zinc can be used for the precipitation by cementation stage mentioned above. Regenerated sulphuric acid solution leaves at 48 and is recycled at 14.

From the above description of the systems of FIGS. 1 to 4, it will be appreciated how flexible and integrated is the process according to the invention.

It is very easily possible, by using a system of valves not shown in the drawings, to change from one variant to another according to the composition of the part of the deposit being processed at a given moment. If it is required to treat an ore containing chiefly zinc, with low content of lead and copper, the system shown in FIG. 1 is chosen.

If an ore contains, simultaneously, considerable proportions of copper, zinc and lead, there may be chosen the system of FIG. 3, in which extraction of zinc is effected by means of an acidic organophosphorus agent. Production of high-purity electrolytic zinc is effected according to the system of FIG. 4. A proportion of this zinc may be utilized for precipitation of the lead.

There now follow some Examples of steps or stages in processes according to the present invention which have the particular aim of enabling specialists to determine easily the operating conditions to be employed in any particular case.

EXAMPLE 1

Leaching of Aljustrel ore by cupric chloride in the presence of sodium chloride.

The tests reported here were effected on a Portuguese ore originating from the Aljustrel province. The ore was a massive pyrite, which had not undergone any physical concentration, and had the following chemical composition by weight:

| Copper: | 1.1% | (as chalcopyrite - $CuFeS_2$) |
| --- | --- | --- |
| Zinc: | 2.64% | |
| Lead: | 0.83% | |
| Arsenic: | 0.76% | |
| Iron: | 42.2% | |

One lot of this ore was subjected to two successive attacks by cupric chloride in a reactor of one liter capacity and fitted with a stirrer and with a reflux condenser. The solid was introduced into the reactor after the solution had been brought to the boil. The main operating parameters were:

| Item | Treatment 1 | Treatment 2 |
| --- | --- | --- |
| Temperature (boiling) | 105° C. | 105° C. |
| Volume of initial treatment solution | 1000 ml | 1000 ml |
| Sodium chloride concentration of treatment solution | 250 g/l | 250 g/l |
| Cupric ion concentration of initial treatment solution | 40 g/l | 40 g/l |
| Weight of solid treated | 389 g | Residue from treatment 1 |
| Stoichiometry of cupric chloride lead + copper + zinc in ore | 1.2 QS (Stoichiometrical Quantity) | 1.2 QS (Stoichiometrical Quantity) |
| Treatment time | 3 h | 3 h |

The reactor contents were filtered at the end of the first treatment. The filter solution was kept for analysis, and the residue was re-treated with a fresh quantity of cupric chloride. At the end of the second treatment filtration, washing of the residue by re-pulping by boiling water, drying of the residue at 105° C. and analyses were successively performed.

In the course of the two treatments, the variations of cuprous and ferrous ion concentrations as a function of time were as follows:

| Treatment time hours - minutes | Treatment 1 | | Treatment 2 | |
| --- | --- | --- | --- | --- |
| | Cuprous ions g/l | Ferrous ions g/l | Cuprous ions g/l | Ferrous ions g/l |
| 0.30 | 24.00 | 4.48 | 14.5 | nd |
| 1.00 | 22.6 | 4.42 | 14.8 | nd |
| 1.30 | | | 16.2 | nd |
| 2.00 | 24.4 | 4.0 | 17.6 | nd |
| 3.00 | 24.6 | 4.0 | 19.6 | nd | nd = not determined

The final balance of materials resulting from these two treatments was as follows:

| Item | Weight or volume g - ml | Copper g/l - % | Total copper g | Zinc g/l - % | Total zinc g | Lead g/l - % | Total lead g |
| --- | --- | --- | --- | --- | --- | --- | --- |
| Starting solutions 1 + 2 | 2000 | 38.8 | 77.6 | | | | |
| Starting product | 389 | 1.1 | 4.28 | 2.64 | 10.3 | 0.83 | 3.22 |
| INPUT TOTAL | | | 81.9 | | 10.3 | | 3.22 |
| Final solution 1 | 1000 | 34.8 | 34.8 | 7.6 | 7.6 | 2.98 | 2.98 |
| Final solution 2 | 1040 | 41 | 42.6 | 2.27 | 2.36 | 0.26 | 0.27 |
| Wash solution | 400 | 0.62 | 0.25 | 0.24 | 0.091 | 0.015 | 0.006 |
| Final residue | 337 | 0.25 | 0.84 | 0.032 | 0.10 | 0.03 | 0.1 |
| OUTPUT TOTAL | | | 78.5 | | 10.15 | | 3.36 |
| Cumulative yield of 2 treatments | | | 80.3 | | 99.0 | | 97.0 |

| Item | Weight or volume, g-ml | Arsenic g/l - % | Total arsenic g | Iron g/l - % | Total iron g | Chloride ions g/l | Total chlorine, g |
| --- | --- | --- | --- | --- | --- | --- | --- |
| Starting solutions 1 + 2 | 2000 | | | | | 205.9 | 411.8 |
| Starting product | 389 | 0.76 | 2.95 | 42.2 | 164 | | |
| INPUT TOTAL | | | 2.95 | | 164 | | 411.8 |
| Final solution 1 | 1000 | 0.50 | 0.50 | 4.88 | 4.88 | 190.3 | 190.3 |
| Final solution 2 | 1040 | 1.14 | 1.19 | 2.84 | 2.95 | 194.5 | 202.3 |
| Wash solution | 400 | 0.046 | 0.02 | 0.1 | 0.04 | 7.4 | 3.0 |
| Final residue | 337 | 0.29 | 0.98 | 46 | 155 | 1.77 | 6.0 |
| OUTPUT TOTAL | | | 2.69 | | 162.9 | | 401.6 |
| Cumulative yield of 2 treatments | | | 63.6 | | 5.26 | | |

The two treatments show the effectiveness of this type of leaching on a rather unreactive ore, provided excess cupric chloride is used. It can also be seen that the selectivity for the dissolution of the non-ferrous metals compared with iron is very good.

EXAMPLE 2

Treatment of ore from Mac Arthur River (Australia) with a mixture of hydrochloric acid and air in the presence of cupric chloride and zinc chloride, and in the absence of sodium chloride.

This Example shows that treatment by a cuprous/cupric ion couple in the absence of sodium chloride is possible in the case of very reactive ores, such as a lead-zinc ore from Mac Arthur River in Australia. In the case of such ores the cuprous ion has very low solubility in the medium under consideration (zinc chloride and cupric chloride), and only forms transitorily.

Treatment was effected as follows:

In a cylindrical reactor, the base of which as made of a porous plate of fritted glass, the temperature of a liter of the initial treatment solution of the following composition was raised to 80° C.:

Zinc: 37.2 g/l (in the form of zinc chloride)

Copper: 15.2 g/l (in the form of cupric chloride)

Compressed air was introduced via the fritted plate at a rate of 160 liters/hour. The ore was introduced into the reactor altogether in the form of a 50 gram sample which was a mixed flotation concentrate having the following analysis:
Zinc: 24.4%
Lead: 10.5%
Iron: 15.6%

The pH of the treatment solution was measured continuously and was maintained at a value of 2 by addition of hydrochloric acid of about 6 N.

The operation was conducted for four hours, at the end of which time no further consumption of acid was observed; 66.5 ml of acid had then been supplied.

At the end of the operation the reactor contents were filtered and the residue obtained was washed with hot water. The balance of the distribution of the principal elements was then assessed. The degrees of solution of the principal elements were:

of a solution of the following characteristics were brought to 100° C.:
Sodium chloride concentration: 270 g/l
Lead concentration (as lead chloride): 41.4 g/l
pH: 1

Then 8.16 g finely powdered zinc were added to the reactor (being 1.2 QS relative to the lead). The zinc powder dissolved, causing precipitation of lead by cementation. The concentrations of zinc and lead in the solution varied as a function of time, as shown by the following table:

| Time in minutes | 0 | 5 | 10 | 20 | 30 |
|---|---|---|---|---|---|
| Zinc, g/l | 0 | 12.8 | 13.4 | 13.5 | 13.5 |
| Lead, g/l | 41.4 | <0.05 | <0.05 | <0.05 | <0.05 |

After recovery of the precipitate by filtration, 25.1 grams of metal were obtained, with the following chemical composition:

| Item | Weight or volume g - ml | Zinc g/l % | Zinc total g | Lead g/l % | Lead total g | Copper g/l % | Copper total g | Iron g/l % | Iron total g | Chloride ions, g/l - % |
|---|---|---|---|---|---|---|---|---|---|---|
| Starting product | 50 | 24.4 | 12.2 | 10.5 | 5.25 | 0.55 | 0.27 | 15.6 | 7.8 | |
| Initial solution | 1000 | 37.2 | 37.2 | | | 15.2 | 15.2 | | | |
| Hydrochloric acid 6N | 66.5 | | | | | | | | | |
| INPUT TOTAL | | | 49.4 | | 5.25 | | 15.5 | | 7.8 | |
| Final solution | 1150 | 38.8 | 44.6 | 0.94 | 1.1 | 12.5 | 14.4 | 0.40 | 0.66 | |
| Final residue | 30.0 | 5.98 | 1.8 | 3.2 | 0.96 | 1.16 | 0.35 | 21.3 | 6.40 | 1.1 |
| Lead dichloride crystallized from treatment solution | 4.5 | | | 74.2 | 3.3 | | | | | |
| Wash solution | 540 | 1.82 | 1.0 | 0.24 | 0.13 | 0.074 | 0.04 | 0.048 | 0.02 | |
| OUTPUT TOTAL | | | 47.4 | | 5.49 | | 14.8 | | 6.9 | |

Zinc = 85.2%
Lead = 82.5% = 100% assuming that the chloride ions of the residue were in the form of lead dichloride
Iron = 7.2%

These results show that treatment by a hydrochloric acid-air mixture can be effected in the absence of sodium chloride, in the case of particularly reactive ores.

EXAMPLES 3 to 7

Recovery of lead

The lead contained in sulphur ores is converted in treatment according to the present invention to lead chloride. This lead chloride can, for example, go into solution during high-temperature treatment and crystallize on cooling. In other cases, if the sulphur ore is very rich in lead and if this lead has low solubility in the treatment liquor (which is the case when the sodium chloride concentration is low), the major part of the lead chloride will remain in the residue.

The lead chloride so obtained, either isolated or mixed with the treatment residue, can be solubilized in a concentrated sodium chloride brine or simply pulped in water (in the case of isolated lead chloride) and treated with various cementation agents to obtain metallic lead.

A number of methods of producing metallic lead from lead chloride will now be exemplified.

EXAMPLE 3

Precipitation of metallic lead by cementation in sodium chloride medium at 270 g/l, by means of zinc powder.

In a cylindrical reactor of one liter capacity and fitted with a mechanical stirrer and reflux condenser, 500 ml Lead: 80.4%
Zinc: 4.27%
Sodium: 2.23%
Chlorine: 3.96%

EXAMPLE 4

Precipitation of lead by cementation in sodium chloride medium at 270 g/l, using a zinc plate.

In the preceding Example the lead precipitate was produced using zinc powder. Zinc powder may prove difficult to obtain and in this Example it is shown that precipitation by cementation by means of a zinc plate is possible. Thus, in a complex ore treatment plant precipitation of lead by cementation can be effected directly using the zinc cathodes produced.

In a reactor fitted with a reflux condenser and a stirring system, a solution of the following composition was brought to 100° C.
Sodium chloride: 270 g/l
Lead: 43 g/l (as lead chloride)
pH: 2

The solution was agitated vigorously by means of a helicoidal agitator turning at 900 rev/min. A lead precipitate appeared on the zinc plate which weighed 30.6 g. At the end of about 15 minutes this precipitate became detached from the plate and fell to the bottom of the reactor.

In the course of treatment, the lead concentration varied thus:

| Time in minutes | 5 | 15 | 30 | 45 |
|---|---|---|---|---|
| Lead, g/l | 19.3 | 1.9 | <0.7 | <0.7 |

At the end of the operation a precipitate was collected, which after filtering and drying has the following characteristics:

| | |
|---|---|
| Weight | 22.3 g |
| Lead concentration | 88% |
| Zinc concentration | 0.69% |
| Sodium concentration | 0.56% |
| Chlorine concentration | 1.07% |

After precipitation by cementation the zinc plate weighed 22.3 g.

EXAMPLE 5

Precipitation of lead by cementation starting from a suspension of lead chloride in water, by means of zinc powder.

Under the conditions of the preceding Examples, a pulp containing 500 ml water and 29 g lead chloride (i.e. 21.6 g lead) was brought to 100° C. Then the zinc powder was added to the reactor and stirring was effected for 30 minutes. At the end of the operation the lead precipitate was collected.

Two experiments were conducted in this way, using different amounts of zinc. The precipitates obtained had the following characteristics:

| Test | % Lead | % Zinc | % Chloride ions | Precipitate weight, g |
|---|---|---|---|---|
| Test 1: 8.7 g of zinc, i.e. 1.2 QS Stoichiometrical Quantity | 82.7 | 10.9 | 0.34 | 24.9 |
| Test 2: 6.8 g of zinc, i.e. 1 QS (Stoichiometrical Quantity) | 82.7 | 4.31 | 0.47 | 24.1 |

EXAMPLE 6

Precipitation of lead by cementation starting from a suspension of lead chloride in water, using iron powder.

The same procedure as the preceding Examples was carried out, but using iron powder in the place of zinc powder. Two experiments were performed, using variable amounts of iron. The precipitates produced had the following characteristics:

| Test | % Lead | % Iron | % Chloride ions | Precipitate weight, g |
|---|---|---|---|---|
| Test 1: 7.8 g of iron, i.e. 1.4 QS (Stoichiometrical Quantity) | 90.0 | 6.1 | 0.11 | 23.6 |
| Test 2: 5.6 g of iron, i.e. 1 QS (Stoichiometrical Quantity) | 92.4 | 2.93 | 0.17 | 20.7 |

EXAMPLE 7

Precipitation of lead by cementation in calcium chloride medium starting from zinc powder.

Lead chloride can be solubilized in calcium chloride instead of sodium chloride. The use of calcium chloride is advantageous in that a higher solubility of lead chloride can be achieved and also in cases where it is desired to increase the chloride ion concentration in such solutions in order, for example, to facilitate subsequent recovery of the zinc.

Using the usual apparatus, the temperature of 500 ml of a solution having the following composition was raised to 100° C.:
Calcium chloride: 600 g/l
Lead: 96 g/l (as lead chloride)
18.2 g zinc powder (i.e. 1.2 QS) was then poured in.
Production of lead in solution as a function of time occurred as follows:

| Time in minutes | 5 | 10 | 20 |
|---|---|---|---|
| Lead g/l | 1.83 | 1.43 | 0.7 |

The precipitate collected (57.5 g) had the following chemical composition:

| | |
|---|---|
| Lead | 78.7% |
| Zinc | 11.5% |
| Calcium | 0.99% |
| Chloride ions | 3.45% |

EXAMPLE 8

Extraction of copper from sulphur ore treatment solution by the product sold under the trade name "LIX 65 N".

This procedure involved producing electrolytic copper starting from sulphur ore leaching solution.

For this purpose a system was built up from a series of seven mixer-decanters, numbered from 1 to 7, and by one electrolysis tank. Mixer 1 was of special design which permitted injection of air into the midst of the emulsion. Mixer-decanters 2 to 7 were conventional laboratory-type apparatus.

The plant was operated in the following way; all operations were accomplished at a temperature of 50° C.

The following were fed into mixer 1:

(1) Fresh solvent, at a rate of 480 ml/h. This solvent was the product sold under the trade name of "LIX 65 N", diluted to 30% by volume with the diluent sold under the trade name of "ESCAID 100";

(2) An aqueous solution, from leaching of a sulphur ore; this solution, fed at a rate of 160 ml/h, had the following composition:

| | |
|---|---|
| Total copper | 60 g/l |
| Cuprous ions | 38.5 g/l |
| Sodium chloride | 250 g/l |
| Iron | 16.6 g/l |
| Lead | 0.6 g/l |
| Silver | 0.09 g/l |

Compressed air at a rate of approximately 5 to 20 liters per hour.

Operations corresponding to the following reactions took place in mixer 1:

$$Cu^{++} + 2RH \rightarrow R_2Cu + 2H^+ \text{ (Extraction)}$$

$$2Cu^+ + 2H^+ + \tfrac{1}{2}O_2 \rightarrow 2Cu^{++} + H_2O \text{ (Oxidation)}$$

thus overall:

$$2Cu^+ + 2RH + \tfrac{1}{2}O_2 \rightarrow R_2Cu + H_2O + Cu^{++}$$

In this way a quantity of copper was extracted corresponding to half of the cuprous ions contained initially in the solution. All the unextracted copper was restored to cupric form and was recycled to a stage for leaching fresh ore.

The aqueous phase/solvent phase mixture was subsequently decanted and the oxidized aqueous phase discharged from the plant, whereas the loaded solvent was directed to the mixer-decanters 2 to 7 as follows:

Washing of loaded solvent: The loaded solvent was directed to mixer-decanters 2 and 3, where it was circulated in counterflow with water for the purpose of removing the majority of the entrained chloride ions. So as to restrict the amount of wash water produced, while maintaining suitable phase ratios for the emulsion, the wash solution was continuously recycled from a buffer tank at a rate of 200 ml per hour. Purging corresponding to a loss of 20 ml per hour was effected on this circuit, the loss being compensated by an equivalent feed of clean water.

Re-extraction: The washed solvent was then re-extracted in mixer-decanters 4 and 5 by circulation in counterflow with a solution coming from a tank for the electrolytic production of copper. This solution had the following composition:
Copper: 30 g/l
Acidity: 3.0 N (as sulphuric acid)

The circulation rate was 240 ml/h.

In the course of this operation the following reaction took place:

$$R_2Cu + 2H_2SO_4 \rightarrow 2RH + CuSO_4$$

The solvent was thus regenerated, while the copper sulphate produced utilised for the production of metallic copper.

Washing of regenerated solvent: To remove the sulphate ions entrained by the solvent, the latter was washed with clean water in mixer-decanters 6 and 7. This wash station operated according to the same principle and under the same flow-rate conditions as the wash station for the loaded solvent. The regenerated solvent was washed to render it suitable for recycling to extraction (mixer 1).

Electrolysis: The copper sulphate solution leaving decanter 4 was passed to an electrolysis tank containing a lead anode and a copper cathode. High-purity copper metal was deposited at the cathode, and the sulphuric acid was regenerated at the anode. The reactions which took place were:

$$Cu^{++} + 2e^- \rightarrow Cu^\circ \text{ (at the cathode)}$$

$$H_2O \rightarrow \tfrac{1}{2}O_2 + 2H^+ + 2e^-$$

$$2H^+ + SO_4^{--} \rightarrow H_2SO_4 \text{ (regenerated acid)}$$

at the anode

The current density employed for electrolysis was 250 amperes per square meter and the potential difference between anode and cathode was 2 volts.

This procedure was continued for 97 hours with respect to the extraction and 85 hours with respect to the electrolysis. The concentration of chloride ions in the electrolysis tank remained less than 500 mg/l.

In this way four copper cathodes were produced, with the following chief impurities:

| Item | Weight g | Sulphur % | Lead | Silver | Iron | Copper |
|---|---|---|---|---|---|---|
| Cathode No. 1 | 89.5 | 0.006 | 0.003 | 0.0004 | 0.0014 | >99.9% |
| Cathode No. 2 | 56.0 | 0.007 | 0.001 | 0.0002 | 0.0011 | >99.9% |
| Cathode No. 3 | 63.9 | 0.012 | <0.001 | 0.0006 | 0.0006 | >99.9% |
| Cathode No. 4 | 65.3 | 0.008 | 0.002 | 0.0006 | 0.0006 | >99.9% |

EXAMPLE 9

Influence of sodium chloride concentration on the capacity and selectivity of zinc extraction by D2EHPA.

The preceding Examples have shown that it is possible to treat complex ores by a hydrochloric acid and air mixture, in the presence of cupric chloride, at various sodium chloride concentrations, or even without sodium chloride at all. There will now be demonstrated the influence of the composition of the medium on the indices of zinc extraction by D2EHPA, with regard to:

(1) the selectivity with respect to other metals generally present, especially copper and lead;

(2) the possibility of liberating hydrogen ions in the aqueous phase during extraction, these hydrogen ions being later employed in the treatment by a hydrochloric acid and air mixture.

For this purpose we prepared three treatment solutions synthetically, corresponding to the three types of treatment which were tested previously, namely:

Solution 1: Concentrated sodium chloride medium; attack by a stoichiometric quantity of copper.

Solution 2: Weak sodium chloride medium; attack by hydrochloric acid and air in the presence of a less than stoichiometric quantity of cupric ions.

Solution 3: Sodium chloride medium replaced by zinc chloride medium (zinc ion concentration=50 g/l); attack by a mixture of hydrochloric acid and air in the presence of a less than stoichiometric quantity of cupric ions.

For greater simplicity the copper was introduced directly in the form of cupric chloride and any neutralizations necessary were effected by means of a soda solution and not by aerial oxidation of the cuprous ions and hydrogen ions.

The synthetic solutions, maintained at 40° C. to prevent crystallization of lead dichloride, were brought into contact with a solvent consisting of D2EHPA diluted to 20% by volume in ESCAID 100.

Two types of contact were effected:

(1) Extraction at constant pH: in this case equal volumes of the two phases were emulsified and the pH adjusted to the desired value by addition of soda or hydrochloric acid as required.

(2) Extraction with a variable organic phase/aqueous phase ratio: in this case contacts were effected for 15 minutes, varying the ratio of the phases. In this way the acidity that could be liberated in the aqueous phase and the corresponding capacity of the solvent were measured.

The results obtained are given in the following table, which shows:

(a) the amount of lead, zinc and copper extracted in the solvent phase during different tests;

(b) the concentration of zinc and copper in the aqueous phase at equilibrium;

(c) the selectivity of zinc extraction with respect to copper; and (d) the pH or acidity in the various tests.

Note that the measurements in the solvent phase were made after washing the organic solution with distilled water, at a ratio of organic/aqueous phase of 2:1.

EXAMPLE 10

Long-term tests of zinc extraction starting from a treatment solution obtained in a sodium chloride medium at 120 g/l.

In this Example electrolytic zinc was produced from a solution obtained by leaching of complex ore. The initial solution was prepared by treating the Mac Arthur River ore with cupric chloride in a sodium chloride medium at 120 g/l. This liquor had the following composition:

| | |
|---|---|
| Sodium chloride | 120 g/l |
| Cuprous ions | g g/l |
| Total copper | 15 g/l |
| Lead | 1.5 g/l |
| Zinc | 14.6 g/l |
| pH | 2 |

For this purpose a system was formed from a series of

| Type of solution | pH | Acidity | Lead orga. phase | Copper orga. phase | Zinc orga. phase | Copper aqu. phase | Zinc aqu. phase | Initial Cu/Zn | Final Cu/Zn |
|---|---|---|---|---|---|---|---|---|---|
| Sodium chloride = 220 g/l | 2.6 | | 0.0045 | 3 | 13.0 | 53.6 | 10.0 | 2.4 | 0.23 |
| Cupric ions = | 2 | | 0.0025 | 1.6 | 11.4 | 43.2 | 11.5 | 2.4 | 0.14 |
| 60 g/l | 1 | 0.008 | 0.0035 | 0.6 | 1.6 | 52.2 | 20.0 | 2.4 | 0.37 |
| Zinc ions = 25 g/l | 0.5 | 0.02 | 0.002 | 0.15 | 0.65 | 50.0 | 24.0 | 2.4 | 0.23 |
| Lead ions = 13 g/l | 0.2 | 0.05 | 0.002 | 0.04 | 0.20 | 45.6 | 24.0 | 2.4 | 0.20 |
| pH constant | 0.1 | 0.07 | 0.0025 | 0.018 | 0.1 | 42 | 24.0 | 2.4 | 0.18 |
| Sodium chloride = 120 g/l | 3 | | 0.004 | 5.5 | 9.0 | 7.2 | 0.16 | 1.66 | 0.6 |
| Cupric ions = | 2 | 0.006 | 0.004 | 0.8 | 6.9 | 12.3 | 1.8 | 1.66 | 0.11 |
| 15 g/l | 1 | 0.06 | 0.004 | 0.04 | 1.4 | 13.3 | 7.5 | 1.66 | 0.03 |
| Zinc ions = 9 g/l | 0.5 | 0.22 | 0.002 | 0.004 | 0.13 | 13.2 | 8.7 | 1.66 | 0.02 |
| Lead ions = 4 g/l | 0.2 | 0.44 | 0.0015 | 0.001 | 0.033 | 12.8 | 8.5 | 1.66 | 0.03 |
| pH constant | 0.1 | 0.52 | 0.0015 | 0.006 | 0.02 | 12.8 | 8.4 | 1.66 | 0.03 |
| Sodium chloride = 120 g/l | | 0.04 | 0.0045 | 0.07 | 2.4 | 14.5 | 8.3 | 1.66 | 0.03 |
| Cupric ions = | | 0.05 | 0.004 | 0.05 | 1.6 | 14.5 | 7.9 | 1.66 | 0.03 |
| 15 g/l | | 0.07 | 0.005 | 0.03 | 0.8 | 14.5 | 7.2 | 1.66 | 0.037 |
| Zinc ions = 9 g/l | | 0.08 | 0.003 | 0.02 | 0.5 | 14.2 | 6.7 | 1.66 | 0.04 |
| Lead ions = 4 g/l Variable ratio org/aq. phases | | | | | | | | | |
| Zinc ions = 50 g/l | 2.5 | | 0.05 | 0.05 | 17.6 | 12.0 | 31 | 0.3 | 0.002 |
| | 2 | 0.008 | 0.004 | 0.004 | 15.4 | 12.5 | 33 | 0.3 | 0.0003 |
| Cupric ions = | 1 | 0.09 | 0.003 | 0.003 | 8.4 | 12.9 | 42 | 0.3 | 0.0004 |
| 15 g/l | 0.5 | 0.28 | 0.004 | 0.004 | 2.4 | 12.2 | 46 | 0.3 | 0.002 |
| Lead ions = 2 g/l | 0.2 | 0.59 | 0.002 | 0.002 | 0.63 | 11.8 | 47 | 0.3 | 0.003 |
| pH constant Zinc ions = 50 g/l | 0.1 | 0.78 | 0.001 | 0.001 | 0.4 | 11.7 | 48 | 0.3 | 0.0025 |
| Cupric ions = | | 0.11 | 0.004 | 0.004 | 7.4 | 13.0 | 46 | 0.3 | 0.0005 |
| 15 g/l | | 0.16 | 0.004 | 0.005 | 5.2 | 13.5 | 46 | 0.3 | 0.001 |
| Lead ions = 2 g/l | | 0.24 | 0.004 | 0.005 | 2.7 | 13.0 | 41 | 0.3 | 0.002 |
| Variable ratio org/aq. phase | | 0.29 | 0.0025 | 0.004 | 2.0 | 13.2 | 41 | 0.3 | 0.002 |

These tests clearly show that:

(i) the solvent has a particular affinity for zinc in all the solutions studied;

(ii) the selectivity of zinc extraction with respect to lead is always good and practically independent of the conditions of the medium, the pH or the acidity;

(iii) the selectivity of zinc extraction with respect to copper varies according to the nature of the solution. Zinc extraction is more selective for weaker sodium chloride concentration in the mother liquor; and (iv) the possibility of liberating hydrogen ions in the aqueous extraction phase depends equally on the nature of this phase. The quantity of acid liberated will be greater the lower the concentration of sodium chloride.

seven mixer-decanters, numbered from 1 to 7, a cementation reactor 8 and an electrolysis tank 9. The mixer-decanter 1 was of a special design and permitted injection of air into the midst of the emulsion. Mixer-decanters 2 to 7 were conventional laboratory type apparatus.

All the operations were conducted at 50° C. and the operational procedure was as follows:

The solution discharged from ore treatment was brought into contact with fresh solvent in the mixer-decanter 1 into which air was admitted. The respective admission rates were 480 ml/h for the aqueous phase and 600 ml/h for the solvent phase.

The following reactions took place:

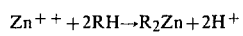

$$Zn^{++} + 2RH \rightarrow R_2Zn + 2H^+$$

$$2Cu^+ + 2H^+ + \tfrac{1}{2}O_2 \rightarrow 2Cu^{++} + 2H_2O$$

As can be seen by comparing the cuprous ion contents before and after extraction, the possibilities represented by these two reactions were utilized to the maximum: complete oxidation of the copper in the cuprous form to neutralize the maximum number of hydrogen ions and the liberation of hydrogen ions into the final solution.

In this way, after decanting we obtained a discharge solution having the following composition:

| | |
|---|---|
| Zinc ions | 11.2 g/l |
| Cuprous ions | 0.3 g/l |
| pH | 1.0 |

The loaded solvent leaving mixer-decanter 1 was then washed in the two mixer-decanters 2 and 3 with a solution of zinc chloride (5 g/l zinc ions). This weak chloride solution permits elimination of the chloride ions entrained by the solvent and also elimination of the copper extracted in the mixer-decanter 1, by replacement of one molecule of copper by one molecule of zinc. This exchange is possible because the wash solution has a low level of chloride ion concentration and, in this case, the solvent has much greater affinity for zinc than for copper, as was seen in Example 9.

So as to obtain suitable ratios of the phases in these two mixer-decanters, the aqueous phase was circulated at 200 ml/h starting from a buffer tank. The fresh wash solution was introduced at a rate of 20 ml/h into this buffer tank and the loaded wash solution was withdrawn at the same rate.

The loaded solvent was then fed into mixer-decanters 4 and 5, where it circulated in counterflow with an acid solution coming from a zinc sulphate electrolysis tank. The rate of circulation of this electrolyte was 40 ml/h and, to obtain suitable ratios of the phases, internal recycling of the aqueous phases from the decanter to the appropriate mixer was employed.

Analyses during treatment in this section of the process gave the following results:

| Item | Zinc g/l | Acidity (N) |
|---|---|---|
| Aqueous phase, entering | 60 | 2.68 |
| Aqueous phase, leaving | 112 | 1.08 |
| Organic phase, entering | 6.0 | |
| Organic phase, leaving | 2.0 | |

The discharged solvent was then passed to mixer-decanters 6 and 7, where it underwent washing with distilled water to remove sulphate ions, which were liable to be entrained. This washing station operated according to the same principle and in the same flow-rate conditions as for chloride washing. The discharged and washed solvent was then perfectly suitable for recycling to the extraction stage in mixer-decanter 1.

The loaded electrolyte leaving decanter 4 was then subjected to further purification at the cementation reactor 8, where traces of impurities liable to have been entrained were precipitated on a zinc plate. After filtering, the purified electrolyte was sent to the electrolysis tank 9, where the zinc sulphate was decomposed to metallic zinc which was deposited at the cathode, while free sulphuric acid was regenerated at the anode. This electrolysis was effected at current density of 350 A/m²; the potential between the terminals was 3.7 volts.

The plant was operated for 30 h 45 min with respect to purification and 19 h 50 min with respect to the electrolysis. The chloride ion concentration at discharge from re-extraction rose to 0.29 g/l only after this length of operating time, which is evidence of the efficacy of the anion-exchange.

Three cathodes were produced, with the following chemical compositions:

| Item | Time | Lead % | Copper % | Silver % | Iron % |
|---|---|---|---|---|---|
| Cathode No. 1 | 0–5 | 0.022 | 0.009 | 0.0003 | 0.0007 |
| Cathode No. 2 | 5–10.5 | 0.054 | 0.013 | 0.0002 | 0.0004 |
| Cathode No. 3 | 10.5–19.5 | 0.046 | 0.02 | 0.0001 | ≦0.0002 |

EXAMPLE 11

Test Of Recovery Of Silver By Selective Electrolysis

| Composition of synthetic solution: | |
|---|---|
| Sodium chloride concentration | 250 g/l |
| Cuprous ion concentration | 30 g/l |
| Cupric ion concentration | nd |
| | 15 to 20 g/l |
| Silver concentration | 150 mg/l |

Electrolysis conditions

Temperature: 50° C.
Agitation under the cathode for diffusion of nitrogen
Graphite anode
Copper cathode
Cathode surface area = anode surface area: 1 dm²
Volume of solution treated: 2.2 liters Reactions at the electrodes Cathode:
$$[CuCl]^+ + e + Cl^- \rightarrow [CuCl_2]^- \quad (1)$$
$$[AgCl_2]^- + e \rightarrow Ag^\circ + 2Cl^- \quad (2)$$
$$[CuCl_2]^- + e \rightarrow Cu + 2Cl^- \quad (3)$$
Anode:
$$[CuCl_2]^+ \rightarrow [CuCl]^+ + e + Cl^- \quad (4)$$

Measurements

The current density was 200 A/m², i.e. a current strength of 2 A.

| Time | Anode-cathode potential | Solution potential relative to saturated calomel electrode | Concentration of silver ions (mg/l) |
|---|---|---|---|
| 0 | 0.90 volts | −190 millivolts | 150 (saturation) |
| 15 min | 0.90 volts | −190 | 138 |
| 30 min | 0.90 | −190 | 140 |
| 50 min | 0.90 | −190 | 120 |
| 1 h 20 | 0.90 | −190 | 125 |
| 1 h 50 | 0.90 | −190 | 112 |
| 2 h 20 | 0.90 | −190 | 96 |
| 2 h 40 | 0.90 | −190 | 97 |

The curve representing the silver ion concentration as a function of time displayed several discontinuities which can be explained by the possible presence of a solid phase of silver chloride in the medium. The solubility limit of silver in sodium chloride medium at 250 g/l is in fact 150 mg/l.

During this electrolysis (2 h 40), 120 mg silver were removed from the solution. The electric power consumption was: W=0.90×2×2.66=4.80 Wh, i.e. 40 kWh per kg of silver.

EXAMPLE 12

Test for selective leaching of Pb by percolation in fixed bed.

Tests on leaching by percolation, using an amount of cupric chloride equal to or greater than stoichiometric, calculated for all the metals Zn, Pb, Cu, showed that the lead dissolved first, then the zinc and finally the copper.

An attempt has been made to exploit this difference in selectivity by employing no more than the quantity of cupric chloride corresponding to the lead, so as to have two quite distinct purification circuits, one for lead and the other for zinc. The test showed that in these conditions there was not only the reaction:

$$2CuCl_2 + PbS \rightarrow 2CuCl + PbCl_2 + S$$

but also the reaction:

$$2CuCl + PbS \rightarrow PbCl_2 + Cu_2S$$

so that the cuprous chloride is itself exchanged with the lead.

The operating conditions are shown in the following table:

|  | Cu | Pb | Zn |
|---|---|---|---|
| Initial leaching solution, g/l | 5 | 0 | 0 |
| Final leaching solution, g/l | 1 | 7.5 | 3.85 |
| Entering concentrate, % | 1.85 | 6 | 15.10 |
| Residual pyrite, % | 5.43 | 0.98 | 13.8 |
| Yield | No solution, but precipitation of Cu$_2$S. | 85% | 20% |

The cuprous sulphide precipitated redissolved well in the second leaching phase, at the same time as the zinc and copper of the ore.

EXAMPLE 13

Extraction of zinc chloride by tributylphosphate, starting from solutions from leaching of complex ores.

The tests in this Example illustrate a variant of the process in which extraction of zinc chloride by tributylphosphate is employed instead of extraction of Zn$^{++}$ cation by D2EHPA. The zinc chloride thus extracted can subsequently be eluted simply with water.

In this series of tests the maximum extraction of ZnCl$_2$ from the aqueous phase was found by effecting three successive contacts between the same aqueous phase, and a solvent phase which was renewed each time, at a ratio O/A=1.

The various tests were effected on aqueous phases containing variable proportions of Zn and Cu, and containing 250 g/l of NaCl. The solvent phase employed was TBP at 50% in SOLVESSO 150. The results of these tests are given in the following table:

| Initial aqueous phase | Contact No. | aqueous phase at equilibrium | | | solvent phase at equilibrium | | |
|---|---|---|---|---|---|---|---|
| | | Zn g/l | Cu g/l | Zn/Cu | Zn g/l | Cu g/l | Zn/Cu |
| Solution No. 1 | 1 | 11.2 | 21.4 | 0.52 | 2.38 | 0.144 | 16.5 |
| Zn = 14.6 g/l | 2 | 8.4 | 21.4 | 0.39 | 1.78 | 0.146 | 12.2 |
| Cu = 21.9 g/l | 3 | 6.2 | 21.0 | 0.30 | 1.39 | 0.146 | 9.52 |
| Solution No. 2 | 1 | 48.9 | 41.3 | 1.18 | 9.84 | 0.33 | 30.0 |
| Zn = 60.8 g/l | 2 | 39.9 | 41.6 | 0.96 | 6.8 | 0.33 | 20.7 |
| Cu = 41.6 g/l | 3 | 32.2 | 41.8 | 0.77 | 6.48 | 0.34 | 19.3 |

EXAMPLE 14

Removal of iron from solutions for treating complex ores, in the presence of excess cuprous chloride.

Precipitation of goethite from chloride solutions containing both Cu$^+$ and Fe$^{++}$ ions is effected by oxidation in the air according to the overall reaction:

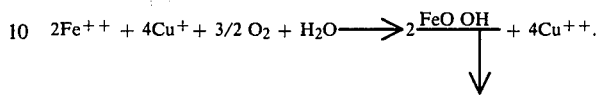

$$2Fe^{++} + 4Cu^+ + 3/2\ O_2 + H_2O \rightarrow 2 FeOOH\downarrow + 4Cu^{++}.$$

When the starting solution contains an amount of ferrous ion above half the concentration of cuprous ion, this reaction is relatively easy to achieve, as the excess of Fe$^{++}$ ions naturally inhibits the reaction at its oxidation pH in neutral medium. Otherwise, and if it is desired to achieve accelerated removal of iron, there is danger that the following reaction may occur, involving considerable losses of copper in the goethite:

$$6\ CuCl + 3\ H_2O + 3/2\ O_2 \rightarrow CuCl_2, 3\ Cu(OH)_2 + CuCl_2$$
(copper oxy-chloride)

It is therefore absolutely essential to restrict oxidation to the first of the above two reactions.

We have found that which of these reactions occurs depends on the values of the pH and of the potential in the solution, and in the experiment described below continuous precipitation of goethite was effected with control of the feed rate of the liquid according to pH. We have in fact found that this parameter shows greatest variation when we go from the goethite precipitation reaction to the copper oxychloride precipitation reaction. Thus, at a temperature between 70° C. and 90° C. it was found that the two precipitation stages, of goethite on the one hand and of copper oxychloride on the other, were separated by about 0.6 pH units.

In a reactor fitted with a stirrer and reflux condenser, 500 ml of solution from leaching of complex ores was maintained at 80° C., and titration was effected with 25.4 g/l of Cu$^+$ ion, 14.6 g/l of Cu$^{++}$ ion, 5.80 g/l of Fe$^{++}$ ion and 250 g/l of NaCl. The bottom of the reactor was formed by a porous plate, through which compressed air was introduced at a rate of approximately 10 l/h. The pH of the solution was measured continuously and it was found that goethite was precipitated in the reactor and that during this time the pH remained stable at about 2.5.

When all the ferrous iron has disappeared from the solution it was found that there was a sharp rise in pH. When this had reached a value of 2.7, the reactor was fed continuously with the starting solution, while an identical amount of solution was withdrawn from the reactor by an overflow system. The solution feed pump was controlled by the pH measuring device, so that the feed rate of the liquid kept the pH at the required value.

Continuous operation was effected for 5 h 54 min, during which a volume of 1400 cm$^3$ of solution was injected.

Filtration of the resultant solution gave 18 g of goethite, which after washing with 100 cm$^3$ of water at pH 2 and at temperature of 90° C. had the following analysis:

Fe: 47.95%
Cu: 1.08%, while the filtrate solution had the following analysis:
Cu+: 14.3 g/l
Fe++: 0.2 g/l.

These results clearly show that it is possible to remove iron from solutions obtained by treatment of complex ores with good efficiency, while limiting the amount of copper entrained in the goethite.

What we claim is:

1. A hydrometallurgical process for treating a sulphur- and zinc-containing ore or concentrate to recover zinc therefrom, which process comprises the following three steps:
   (a) leaching the ore or concentrate with an aqueous solution of cupric chloride thereby forming cuprous chloride;
   (b) subjecting the solution thus obtained to liquid-liquid extraction by means of an organic phase to oxtract zinc into the organic phase while concurrently oxidizing cuprous chloride to cupric chloride; and
   (c) recovering the zinc extracted into the organic phase.

2. A process according to claim 1, wherein said aqueous solution of cupric chloride is regenerated "in situ" by means of a regenerating agent and air at atmospheric pressure.

3. A process according to claim 2, wherein said regenerating agent is hydrochloric acid.

4. A process according to claim 2, wherein said regenerating agent is ferrous chloride, the pH of said aqueous solution of cupric chloride is from 1 to 3, and the concentration of cuprous ions in said aqueous solution of cupric chloride is greater than 1 gram per liter.

5. A process according to claim 1, wherein said aqueous solution of cupric chloride contains an agent for the solubilization of the cuprous chloride selected from the group consisting of alkali metal chlorides, alkaline-earth metal chlorides, ammonium chloride and ferrous chloride.

6. A process according to claim 1, wherein the leaching step (a) is effected at a temperature of not less than 50° C.

7. A process according to claim 1, wherein said aqueous solution of cupric chloride has redox potential of from 400 to 800 millivolts relative to the potential of a hydrogen electrode throughout the leaching step (a).

8. A process according to claim 1, wherein the organic phase used in step (b) contains an organophosphorus acid as a zinc extractant.

9. A process according to claim 8, wherein said organophosphorus acid is di-2-ethyl-hexylphosphoric acid.

10. A process according to claim 8, wherein said acid is mixed with a diluent.

11. A process according to claim 10, wherein said diluent is an oil distillation fraction the ebullition point of which is about 150° C. and the content of which exceeds 99% of aromatic hydrocarbons.

12. A process according to claim 10, wherein said diluent is an oil distillation fraction which is a mixture of about 20% of aromatic hydrocarbons and about 80% of aliphatic hydrocarbons.

13. A process according to claim 8, wherein the cuprous ions contained in said leaching solution are oxidized by means of air during the extraction step (b).

14. A process according to claim 8, wherein the recovery step (c) is effected by elution with sulphuric acid.

15. A process according to claim 14, wherein the zinc sulphate solution obtained in the recovery step (c) is subjected to electrolysis.

16. A process according to claim 1, wherein the ore or concentrate also contains lead and the process additionally includes a lead recovery stage.

17. A process according to claim 16, wherein the lead recovery stage comprises precipitating lead in the metallic state by cementation.

18. A process according to claim 17, wherein said cementation is effected by means of zinc.

19. A process according to claim 16, wherein the lead recovery stage comprises cooling the leaching solution and isolating therefrom crystals of lead chloride so formed.

20. A process according to claim 19, wherein the lead chloride is dissolved in an aqueous solution of chlorides of metals selected from the group consisting of alkali and alkaline-earth metals, and lead is precipitated in the metallic state by cementation.

21. A process according to claim 19, wherein the chloride is pulped and lead is precipitated in the metallic state by cementation.

22. A process according to claim 20, wherein said cementation is effected by means of iron powder.

23. A process according to claim 1, where the ore or concentrate also contains copper and the process additionally includes a copper recovery stage.

24. A process according to claim 23, wherein the copper recovery stage comprises liquid-liquid extraction by means of an organic phase, then recovery of copper contained in the latter by elution.

25. A process according to claim 23, wherein the copper recovery stage comprises precipitating copper by cementation.

26. A process according to claim 25, wherein the cementation is effected by means of metallic lead.

27. A process according to claim 25, wherein the cementation is effected by means of zinc.

28. A process according to claim 1, wherein the ore or concentrate also contains one or more precious metals and the process additionally includes a stage for recovery of precious metals.

29. A process according to claim 28, wherein the stage for recovery of precious metals comprises precipitating the precious metals by cementation using metallic copper.

30. A process according to claim 28, wherein the stage for recovery of precious metals comprises reducing the precious metals electrolytically.

31. A process according to claim 1, wherein the leaching step (a) is conducted by first leaching with a solution containing an amount of cupric chloride approximately equal to the stoichiometric quantity necessary to dissolve the lead present in the ore or concentrate in the form of lead dichloride, isolating the lead dichloride solution, and recovering the lead therefrom, and then leaching the ore or concentrate with a solution having a cupric chloride concentration sufficient to dissolve the remainder of the non-ferrous metals present in the ore or concentrate.

32. A hydrometallurgical process for treating an initial product selected from the group consisting of a sulphurized ore and concentrate containing, as constituents, iron, zinc, silver, copper, and lead, the lead content being low in comparison to the copper content, in the form of their metal sulphides, to recover any or all of said constituents, comprising:

(a) leaching the initial product with an aqueous solution of cupric chloride whereby the metal sulphides are converted to their corresponding soluble metal chlorides, the cupric chloride is reduced to cuprous chloride, and elemental sulphur is produced;

(b) separating the sulphur and any unreacted residue from the reaction mixture;

(c) regenerating the resulting solution in situ, at atmospheric pressure, with air and a regenerating agent selected from the group consisting of hydrochloric acid and ferrous chloride, whereupon the cuprous chloride is oxidized to cupric chloride and recycled for additional leaching to step (a), and the iron is precipitated as goethite and separated from the aqueous solution;

(d) contacting a portion of the resulting aqueous solution, now free of sulphur, residue, and iron, and containing the aforesaid soluble metal chlorides and cuprous chloride, with metallic copper whereby silver is precipitated by cementation and recovered;

(e) contacting the aqueous solution obtained from step (d) and now free of sulphur, residue, iron, and silver, with metallic lead or zinc whereby metallic copper is precipitated by cementation and recovered;

(f) contacting the aqueous solution obtained from step (e) and now free of sulphur, residue, iron, silver, and copper, with metallic zinc whereby lead is precipitated by cementation and recovered;

(g) combining the aqueous solution obtained from step (f) and now free of sulphur, residue, iron, silver, copper, and lead, with the remaining portion of the aqueous solution from step (d) and subjecting the thus-combined aqueous solutions to liquid-liquid extraction with an organic phase containing an extraction agent for zinc, at a pH between 0.3 and 1.5, while concurrently oxidizing the cuprous chloride to cupric chloride, thereby to obtain a zinc-free aqueous phase, containing some dissolved metal chlorides, which is recycled to step (a) and an organic phase containing the extracted zinc; and (h) recovering the zinc from the organic phase of step (g) and recycling the organic phase back to step (g).

33. The process of claim 32 wherein the zinc is recovered in step (h) as zinc sulphate by reacting the zinc-laden organic phase with an aqueous solution of sulphuric acid to obtain an aqueous solution of zinc sulphate.

34. The process of claim 33 wherein the zinc is recovered in substantially pure form by electrolyzing the zinc sulphate obtained in claim 33 to obtain zinc in a purity exceeding 99.9%, and the regenerated aqueous sulphuric acid solution is recycled to step (h).

35. The process of claim 32 wherein the silver cementation by copper is carried out by electrochemical means.

36. The process of claim 32 wherein the zinc extraction agent is an organophosphorus compound.

37. The process of claim 32 wherein the zinc extraction agent is diluted with a diluent.

38. The process of claim 37 wherein the diluent is kerosene.

39. The process of claim 37 wherein the diluent is an oil distillation fraction the ebullition point of which is about 150° C. and the content of which exceeds 99% in aromatic hydrocarbons.

40. The process of claim 37 wherein the diluent is an oil distillation fraction which is a mixture of about 20% of aromatic hydrocarbons and about 80% of aliphatic hydrocarbons.

41. The process of claim 32 wherein the zinc extraction temperature ranges between 20° and 60° C.

42. The process of claim 32 wherein the ratio of the volume of the organic phase to the volume of the aqueous phase in the zinc extraction step (g) ranges between 0.5 and 5.

43. A hydrometallurgical process for treating an initial product selected from the group consisting of a sulphurized ore and concentrate containing, as constituents, iron, zinc, silver, copper, and lead, the lead content being high in comparison to the copper content, in the form of their metal sulphides, to recover any or all of said constituents, comprising:

(a) leaching the initial product with an aqueous solution of cupric chloride whereby the metal sulphides are converted to their corresponding soluble metal chlorides, the cupric chloride is reduced to cuprous chloride, and elemental sulphur is reduced;

(b) separating the sulphur and any unreacted residue from the reaction mixture;

(c) regenerating the resulting solution in situ, at atmospheric pressure, with air and a regenerating agent selected from the group consisting of hydrochloric acid and ferrous chloride, whereupon the cuprous chloride is oxidized to cupric chloride and recycled for additional leaching to step (a), and the iron is precipitated as goethite and separated from the aqueous solution;

(d) cooling the resulting aqueous solution, now free of sulphur, residue, and iron, and containing the aforesaid soluble metal chlorides including lead dichloride and cuprous chloride to crystallize the lead dichloride, separating the lead dichloride crystals, and recovering the lead therefrom;

(e) contacting a portion of the resulting aqueous solution now free of sulphur, residue, iron, and lead, and containing the aforesaid soluble metal chlorides and cuprous chloride, with metallic copper whereby silver is precipitated by cementation and recovered;

(f) contacting the aqueous solution obtained from step (e) and now free of sulphur, residue, iron, lead, and silver, with metallic lead or zinc whereby metallic copper is precipitated by cementation and recovered;

(g) combining the aqueous solution obtained from step (f) and now free of sulphur, residue, iron, lead, silver, and copper, with the remaining portion of the aqueous solution from step (e) and subjecting the thus-combined aqueous solutions to liquid-liquid extraction with an organic phase containing an extraction agent for zinc, at a pH between 0.3 and 1.5, while concurrently oxidizing the cuprous chloride to cupric chloride, thereby to obtain a zinc-free aqueous phase, containing some dissolved metal chlorides, which is recycled to step (a) and an organic phase containing the extracted zinc; and (h) recovering the zinc from the organic phase of step (g) and recycling the organic phase back to step (g).

44. The process of claim 43 wherein the lead is recovered in step (d) by redissolving the lead dichloride crystals in a member selected from the group consisting of an alkali metal chloride and an alkaline earth metal chloride and contacting the resulting solution with zinc to precipitate the lead by cementation, the resulting mother liquor being recycled to step (a).

45. The process of claim 43 wherein the lead is recovered in step (d) by pulping the lead chloride and contacting it with metallic iron or zinc to precipitate the lead by cementation, the resulting mother liquor being recycled to step (c) if ferrous chloride is involved or to step (d) if zinc chloride is involved.

46. A hydrometallurgical process for treating an initial product selected from the group consisting of a sulphurized ore and concentrate containing, as constituents, iron, zinc, silver, copper, and lead, the copper, lead, and zinc contents being high in comparison to the other metals, in the form of their metal sulfides, to recover any or all of said constituents, comprising:
(a) leaching the initial product with an aqueous solution of cupric chloride whereby the metal sulphides are converted to their corresponding soluble metal chlorides, the cupric chloride is reduced to cuprous chloride, and elemental sulphur is produced;
(b) separating the sulphur and any unreacted residue from the reaction mixture;
(c) regenerating the resulting solution in situ, at atmospheric pressure, with air and a regenerating agent selected from the group consisting of hydrochloric acid and ferrous chloride, whereupon the cuprous chloride is oxidized to cupric chloride and recycled for additional leaching to step (a), and the iron is precipitated as goethite and separated from the aqueous solution;
(d) cooling the resulting aqueous solution, now free of sulphur, residue, and iron, and containing the aforesaid soluble metal chlorides including lead chloride and cuprous chloride to crystallize the lead dichloride, separating the lead chloride crystals, and recovering the lead therefrom;
(e) subjecting a portion of the resulting aqueous solution, now free of sulphur, residue, and lead, and containing the aforesaid soluble metal chlorides and cuprous chloride to liquid-liquid extraction with an organic phase containing an extraction agent for zinc, at a pH between 0.3 and 1.5, while concurrently oxidizing the cuprous chloride to cupric chloride, whereupon an organic phase containing the extracted zinc and an aqueous phase containing the remaining soluble metal chlorides are obtained;
(f) recovering the zinc from the organic phase of step (e) and recycling the organic phase back to step (e);
(g) contacting the aqueous phase from step (e), now free of sulphur, residue, iron, lead, and zinc, and containing the remaining soluble metal chlorides, with copper whereby silver is precipitated by cementation and recovered;
(h) subjecting the resulting aqueous solution, now free of sulphur, residue, iron, lead, zinc, and silver, and containing cuprous chloride, to liquid-liquid extraction with an organic phase containing an extraction agent for copper to obtain a copper-laden organic phase, while concurrently oxidizing the cuprous chloride to cuprous chloride which is recycled to step (a) for additional leaching; and
(i) recovering the copper from the organic phase and recycling the copper-free organic phase back to step (h).

47. The process of claim 46 wherein the recovery of the copper in step (g) is carried out by contacting the organic phase containing the copper with an aqueous sulphuric acid solution to obtain an aqueous solution of copper sulphate in which form the copper is recovered.

48. A hydrometallurgical process for treating a sulphurized ore or concentrate containing iron and rich in zinc and copper, in the form of their sulphides to recover the sulphur, iron, zinc, and copper values therefrom, comprising:
(a) leaching the ore or concentrate with an aqueous solution of cupric chloride whereupon the zinc and copper sulphides are converted to soluble zinc and cupric chlorides, the cupric chloride is reduced to cuprous chloride, and elemental sulphur is produced;
(b) separating the sulphur and any unreacted residue from the reaction mixture;
(c) regenerating the resulting solution, in situ, at atmospheric pressure, with air and a regenerating agent selected from the group consisting of hydrochloric acid and ferrous chloride to oxidize the cuprous chloride to cupric chloride so as to provide a concentration of cuprous ions exceeding 1 gram per liter in the resulting aqueous solution of cupric chloride which is recycled for additional leaching to step (a) and the iron is precipitated as goethite and separated from the aqueous solution;
(d) subjecting the resulting aqueous solution, now free of sulphur, residue, and iron, and containing zinc and copper chlorides to liquid-liquid extraction with a neutral organic zinc extracting agent to obtain an organic phase containing the extracted zinc and an aqueous phase containing copper chlorides;
(e) recovering the zinc from the organic phase and recycling the zinc-free organic phase to step (d);
(f) subjecting the aqueous phase containing copper chlorides to liquid-liquid extraction with an organic copper-extraction cationic agent to obtain an organic phase containing the copper, the acidity released by this extraction being absorbed by the regeneration of cupric chloride; and
(g) recovering the copper from the organic phase and recycling the copper-free organic phase to step (f).

49. The process of claim 48 wherein the zinc extracting agent is tributyl phosphate.

50. The process of claim 48 wherein the copper-extraction cationic agent is a compound of the formula:

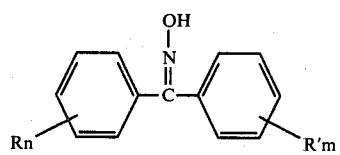

51. A hydrometallurgical process for treating a sulphurized ore or concentrate containing iron, lead, and zinc sulphides to recover the lead and zinc values therefrom, comprising:
(a) contacting the ore or concentrate with an aqueous solution of cupric chloride approximately equal to the stoichiometrical quantity necessary to dissolve only the lead contained in the ore or concentrate thereby to obtain an aqueous solution of lead chloride and a solid residue of ore or concentrate;

(b) separating the aqueous solution of the lead chloride from the residue of the ore or concentrate;

(c) recovering the lead from the separated aqueous solution of lead chloride;

(d) leaching the residue of the ore or concentrate with an aqueous solution of cupric chloride whereupon the zinc sulphide is converted to zinc chloride, the cupric chloride is reduced to cuprous chloride, and elemental sulphur is produced;

(e) separating the sulphur and any unreacted residue from the reaction mixture;

(f) regenerating the resulting solution, in situ, at atmospheric pressure, with air and a regenerating agent selected from the group consisting of hydrochloric acid and ferrous chloride, whereupon the cuprous chloride is oxidized to cupric chloride and recycled for additional leaching to step (d) and the iron is precipitated as goethite and separated from the aqueous solution;

(g) subjecting the resulting aqueous solution, now free of lead, sulphur, residue, and iron, and containing zinc and copper chlorides to liquid-liquid extraction with a cationic zinc-extracing agent to obtain an organic phase containing the extracted zinc, and an aqueous phase containing copper chlorides which is recycled to step (d), the acidity released by extraction being absorbed by the regeneration of cupric chloride; and (h) recovering the zinc from the organic phase and recycling the zinc-free organic phase to step (g).

52. The process of claim 51 wherein the cationic zinc-extracting agent is an acid organophosphate compound.

53. The process of claim 52 wherein the acid organophosphate compound is di-2-ethyl-hexylphosphoric acid.

54. A hydrometallurgical process for treating a sulphur- and zinc-containing ore or concentrate to recover zinc therefrom, which process comprises the following three steps:

(a) leaching the ore or concentrate with an aqueous solution of cupric chloride to obtain a solution containing zinc and copper in the form of cuprous ions;

(b) contacting the solution thus obtained with a neutral organophosphorus compound to selectively extract zinc from the solution; and (c) recovering the zinc extracted into the neutral organophosphorus compound.

55. The process of claim 54, in which the zinc is recovered from the organophosphorus compound by contacting the organophosphorus compound with a stripping solution.

56. The process of claim 55, in which the stripping solution is water.

57. The process of claim 56, in which the stripping solution obtained is electrolyzed to obtain metallic zinc and chlorine.

58. The process of claim 57, in which the stripping solution obtained after being electrolyzed is recycled to step (a).

59. The process of claim 57, in which the chlorine is recycled to regenerate the leaching solution.

60. A process for extracting zinc from an aqueous solution containing zinc and copper in which at least a portion of the copper is present as cuprous ions comprising contacting the aqueous solution with an organic phase containing a cationic extraction agent having an affinity for zinc while concurrently oxidizing the cuprous ions in the aqueous solution to cupric ions.

61. The process of claim 60, in which the cationic extraction agent is an acid organophosphate compound.

62. The process of claim 60, in which the cationic organic extractant is di-2-ethyl-hexylphosphoric acid.

63. The process of claim 60, in which the cationic extraction agent has an affinity for copper and copper is co-extracted with the zinc.

64. The process of claim 63, in which the cationic extraction agent is contacted with a first stripping solution to strip copper from the extraction agent.

65. The process of claim 64, in which the cationic extraction agent is contacted with a second stripping solution to strip zinc from the extraction agent.

66. The process of claim 65, in which the second stripping solution is concentrated sulphuric acid.

67. The process of claim 60, in which the aqueous solution contains ferric ions which are removed from the aqueous solution prior to contacting the aqueous solution with the cationic extraction agent.

68. The process of claim 67, in which the ferric ions are precipitated as goethite prior to contacting the aqueous solution with the cationic extraction agent.

69. The process of claim 60, in which the cuprous ions are oxidized to cupric ions with air.

* * * * *